United States Patent
Arthur et al.

(10) Patent No.: US 6,372,869 B1
(45) Date of Patent: Apr. 16, 2002

(54) MOLECULAR WEIGHT CONTROL IN OLEFIN POLYMERIZATION

(75) Inventors: Samuel David Arthur; Stephan James McLain, both of Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/317,557

(22) Filed: May 24, 1999

Related U.S. Application Data

(60) Provisional application No. 60/086,646, filed on May 26, 1998.

(51) Int. Cl.[7] .............................. C08F 2/40; C08F 2/42; C08F 4/70; C08F 4/80
(52) U.S. Cl. .................. 526/126; 526/128; 526/144; 526/161; 526/169.1; 526/171; 526/172; 526/901; 526/905; 526/135
(58) Field of Search .............. 526/161, 169.1, 526/171, 172, 126, 128, 905, 144

(56) References Cited

U.S. PATENT DOCUMENTS

| | | | |
|---|---|---|---|
| 5,344,900 A | * | 9/1994 | Maezawa et al. ............ 526/160 |
| 5,539,076 A | | 7/1996 | Nowlin et al. ............ 526/348.1 |
| 5,578,690 A | * | 11/1996 | Marks et al. ................ 526/347 |
| 5,714,556 A | | 2/1998 | Johnson et al. ............. 526/135 |
| 5,811,499 A | * | 9/1998 | Castner ....................... 526/143 |
| 5,880,241 A | | 3/1999 | Brookhart et al. ........... 526/348 |
| 5,883,204 A | * | 3/1999 | Spencer et al. ............. 526/134 |
| 6,114,483 A | * | 9/2000 | Coughlin et al. ............ 526/172 |
| 6,194,341 B1 | * | 2/2001 | Canich et al. .............. 502/113 |

FOREIGN PATENT DOCUMENTS

| | | | |
|---|---|---|---|
| EP | 522635 | * 1/1993 | |
| EP | 0 720 990 A2 | 10/1996 | ........... C08F/10/00 |
| EP | 0 739 910 A2 | 10/1996 | ........... C08F/10/02 |
| WO | WO 96/23010 | 8/1996 | ......... C08F/210/16 |
| WO | WO 98/30609 | 7/1998 | ........... C08F/10/00 |
| WO | WO 98/30610 | 7/1998 | ........... C08F/10/00 |
| WO | WO 98/42664 | 10/1998 | ......... C07D/207/00 |

OTHER PUBLICATIONS

CAS abstract 116:20639 of Pomogailo et al., Koord. Khim. 17(10), pp. 1389–93, 1991.*
CAS abstract 92:214884 of Yuffa et al., Otkrytiya Izobret., Prom. Obraztsy, Tovarnye Znaki (3), p. 105, 1980.*
International Search Report dated Feb. 24, 2000 re: PCT/US99/11552.

* cited by examiner

Primary Examiner—David W. Wu
Assistant Examiner—R. Rabago

(57) ABSTRACT

The molecular weight of polyolefins produced using selected late transition metal complexes of bidentate ligands may be lowered by carrying out the polymerization in the presence of hydrogen, a selected silane, or $CBr_4$.

15 Claims, No Drawings

MOLECULAR WEIGHT CONTROL IN OLEFIN POLYMERIZATION

CROSS-REFERENCE TO RELATED APPLICATION

This application claims priority under 35 U.S.C. §119 from U.S. Provisional Application Ser. No. 60/086,646 (filed May 26, 1998).

FIELD OF THE INVENTION

In olefin polymerizations in which late transition metal complexes of selected ligands, such as α-diimines, are used as polymerization catalysts, various compounds, such as hydrogen or selected silanes, may be used as chain transfer agents to reduce polyolefin molecular weight.

TECHNICAL BACKGROUND

Polymerization of olefins using early transition metal containing catalysts such as vanadium and zirconium is a well known and commercially important technology. In many instances it is desirable to lower the molecular weight of the polyolefin that would normally be produced. For example lower molecular weight polymers are usually considered easier to melt process, since they have lower melt viscosities. While polymerization process conditions can sometimes be altered to change the molecular weight of the resulting olefin, often a chain transfer agent such as hydrogen is deliberately added to the process to lower the polyolefin molecular weight.

The polymerization of olefins using late transition metal containing catalysts such as nickel with selected bidentate ligands is known, see for instance U.S. Pat. No. 5,714,556, World Patent Application 96/23010, and U.S. patent application Ser. No. 09/006,536, filed Jan. 13, 1998, now U.S. Pat. No. 6,174,975 (World Patent Application 98/30609). However, methods for lowering the molecular weight of polyolefins produced in such processes are not well known. Since these processes often give polyolefins with unique and valuable structures, methods for controlling the polymer molecular weight are desirable.

SUMMARY OF THE INVENTION

This invention concerns, a process for the polymerization of a polymerizable olefin using as a polymerization catalyst a complex of a bidentate ligand of a metal selected from the group consisting of nickel, iron, and cobalt, wherein the improvement comprises, using as a chain transfer agent an effective amount of hydrogen, $CBr_4$ or a compound of the formula $R^1R^2R^3SiH$, wherein $R^1$ is alkyl containing 2 or more carbon atoms, $R^2$ is alkyl, and R is hydrogen or alkyl.

This invention also concerns a process for the polymerization of one or more polymerizable olefins, comprising, contacting:

(a) one or more polymerizable olefins;
(b) an effective amount of a chain transfer agent selected from the group consisting of hydrogen, $CBr_4$ and a compound of the formula $R^1R^2R^3SiH$, wherein $R^1$ is alkyl, $R^2$ is alkyl, and $R^3$ is hydrogen or alkyl;
(c) an active polymerization catalyst which contains a nickel complex of a ligand of the formula

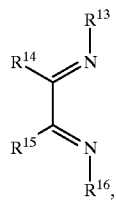

(IV)

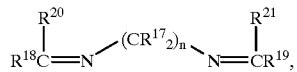

(V)

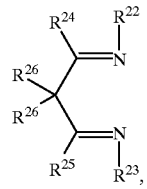

(VI)

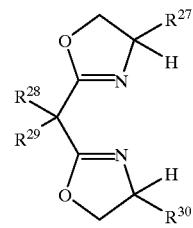

(VII)

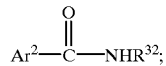

(X)

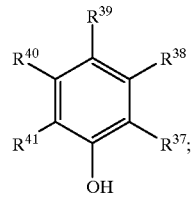

(XI)

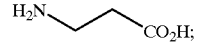

(XII)

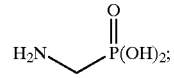

(XIII)

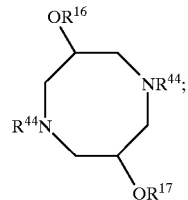

(XIV)

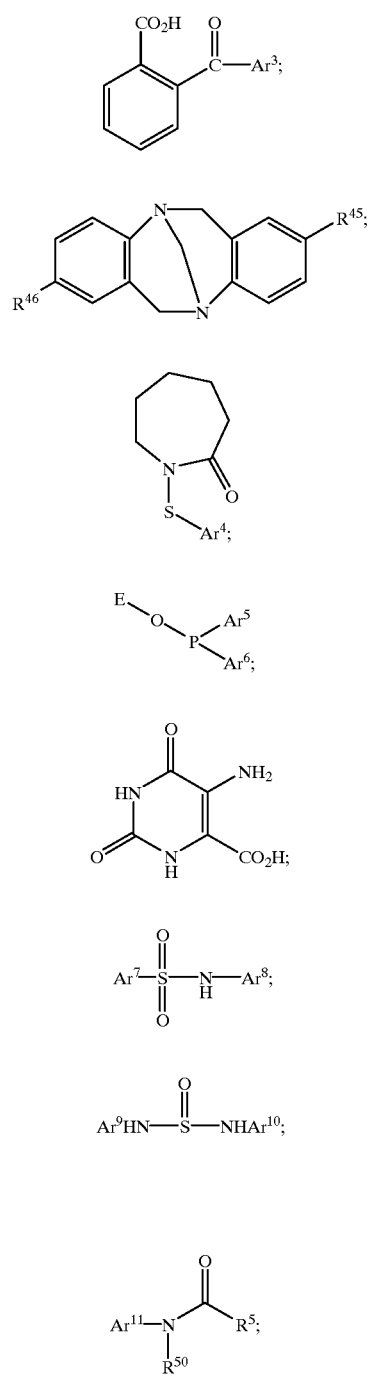
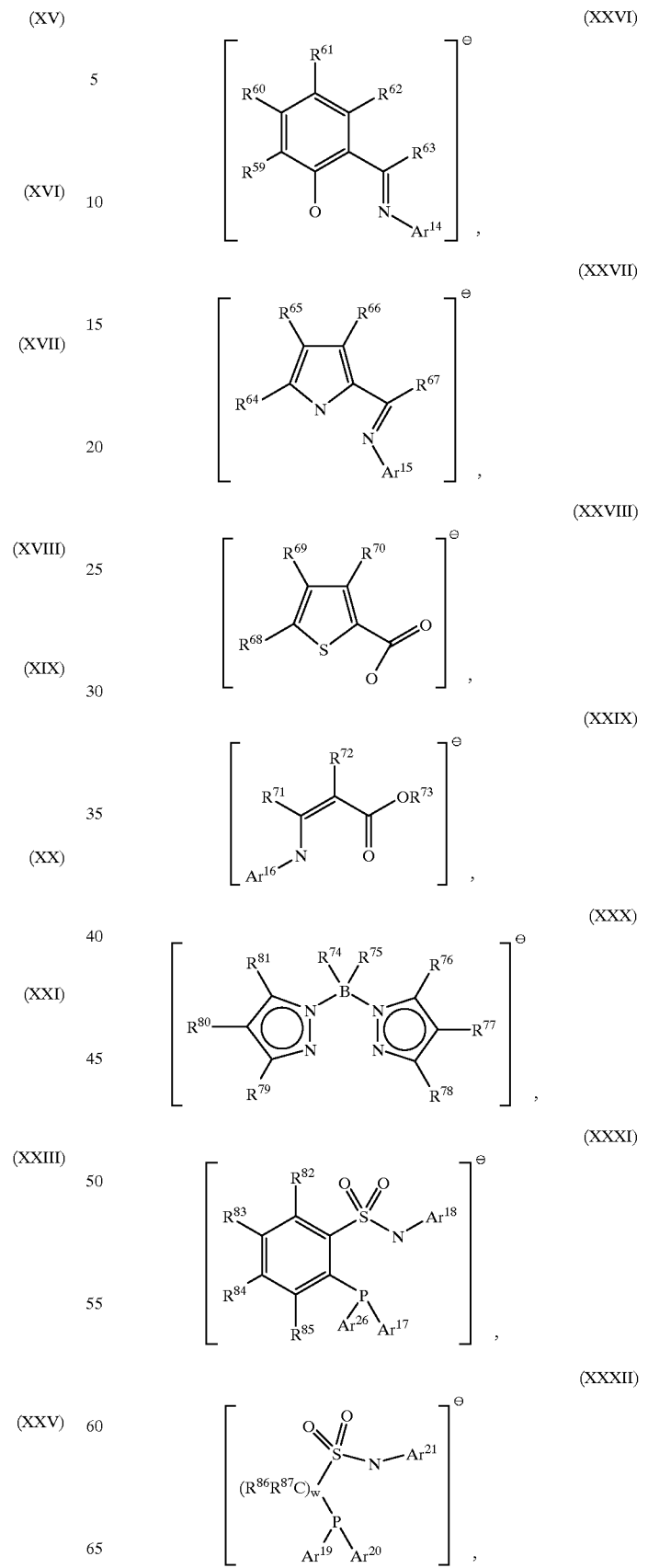

-continued

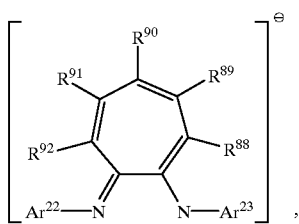
(XXXIII)

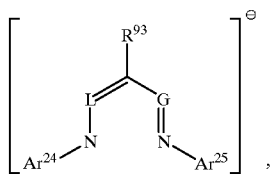
(XXXIV)

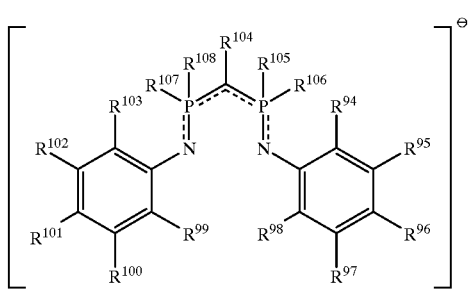
(XXXV)

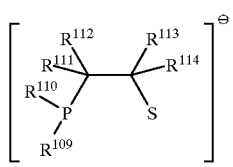
(XXXVI)

or a compound of the formula

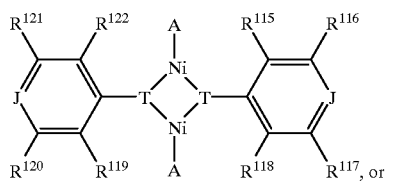
(XXXVII)

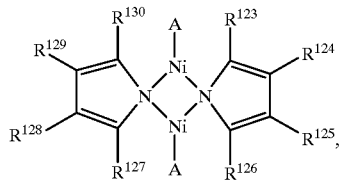

wherein:
$Ar^1$ is an aromatic moiety with n free valencies, or diphenylmethyl;
each Q is —$NR^{52}R^{53}$ or —$CR^{54}$=$NR^{55}$;
p is 1 or 2;
E is 2-thienyl or 2-furyl;
each $R^{52}$ is independently hydrogen, benzyl, substituted benzyl, phenyl or substituted phenyl;

each $R^{54}$ is independently hydrogen or hydrocarbyl; and
each $R^{55}$ is independently a monovalent aromatic moiety;
m is 1, 2 or 3;
$R^{53}$ is hydrogen or alkyl;
each $R^{16}$ and $R^{17}$ is independently hydrogen or acyl containing 1 to 20 carbon atoms;
each $R^{33}$, $R^{34}$, $R^{35}$, and $R^{36}$ is independently hydrogen, hydrocarbyl or substituted hydrocarbyl;
each $R^{31}$ is independently hydrocarbyl or substituted hydrocarbyl containing 2 or more carbon atoms;
each $R^{32}$ is independently hydrogen, hydrocarbyl or substituted hydrocarbyl;
$Ar^2$ is an aryl moiety;
$R^{38}$, $R^{39}$, and $R^{40}$ are each independently hydrogen, hydrocarbyl, substituted hydrocarbyl or an inert functional group;
$R^{37}$ and $R^{41}$ are each independently hydrocarbyl, substituted hydrocarbyl or an inert functional group whose $E_s$ is about −0.4 or less;
$Ar^3$ is an aryl moiety;
$R^{45}$ and $R^{46}$ are each independently hydrogen or hydrocarbyl;
$Ar^4$ is an aryl moiety;
$Ar^5$ and $Ar^6$ are each independently hydrocarbyl;
$Ar^7$ and $Ar^8$ are each independently an aryl moiety;
$Ar^9$ and $Ar^{10}$ are each independently an aryl moiety or —$CO_2R^{56}$, wherein $R^{56}$ is alkyl containing 1 to 20 carbon atoms;
$Ar^{11}$ is an aryl moiety;
$R^{50}$ is hydrogen or hydrocarbyl;
$R^{51}$ is hydrocarbyl or —C(O)—$NR^{50}$—$Ar^{11}$;
$R^{44}$ is aryl;
$R^{47}$ and $R^{48}$ are each independently phenyl groups substituted by one or more alkoxy groups, each alkoxy group containing 1 to 20 carbon atoms;
$R^{49}$ is alkyl containing 1 to 20 carbon atoms, or an aryl moiety;
$R^{13}$ and $R^{16}$ are each independently hydrocarbyl or substituted hydrocarbyl, provided that the carbon atom bound to the imino nitrogen atom has at least two carbon atoms bound to it;
$R^{14}$ and $R^{15}$ are each independently hydrogen, hydrocarbyl, substituted hydrocarbyl, or $R^{14}$ and $R^{15}$ taken together are hydrocarbylene substituted hydrocarbylene to form a carbocyclic ring;
$R^{18}$ is hydrocarbyl or substituted hydrocarbyl, and $R^{20}$ is hydrogen, hydrocarbyl or substituted hydrocarbyl or $R^{18}$ and $R^{20}$ taken together form a ring;
$R^{19}$ is hydrocarbyl or substituted hydrocarbyl, and $R^{21}$ is hydrogen, substituted hydrocarbyl or hydrocarbyl, or $R^{19}$ and $R^{21}$ taken together form a ring;
each $R^{17}$ is independently hydrogen, substituted hydrocarbyl or hydrocarbyl, or two of $R^{17}$ taken together form a ring;
$R^{27}$ and $R^{30}$ are independently hydrocarbyl or substituted hydrocarbyl;
$R^{28}$ and $R^{29}$ are each in independently hydrogen, hydrocarbyl or substituted hydrocarbyl; and
n is 2 or 3;
$Ar^{12}$, $Ar^{13}$, $Ar^{15}$, $Ar^{16}$, $Ar^{22}$, $Ar^{23}$, $Ar^{24}$, and $Ar^{25}$ are each independently aryl or substituted aryl;
$R^{56}$ and $R^{57}$ are each independently hydrogen, hydrocarbyl, substituted hydrocarbyl, or $R^{57}$ and $R^{57}$ taken together form a ring, and $R^{58}$ is hydrogen, hydrocarbyl or substituted hydrocarbyl or $R^{56}$, $R^{57}$ and $R^{58}$ taken together form a ring;

each $R^{31}$ is independently hydrogen, substituted hydrocarbyl or hydrocarbyl, or two of $R^{31}$ taken together form a ring;

$R^{22}$ and $R^{23}$ are each independently hydrocarbyl or substituted hydrocarbyl, provided that the carbon atom bound to the imino nitrogen atom has at least two carbon atoms bound to it;

$R^{24}$ and $R^{25}$ are each independently hydrogen, hydrocarbyl, or substituted hydrocarbyl;

A is a π-allyl or π-benzyl group;

$R^{63}$ and $R^{67}$ are each independently hydrogen, hydrocarbyl or substituted hydrocarbyl;

$R^{62}$, $R^{61}$, $R^{60}$, $R^{59}$, $R^{66}$, $R^{65}$, $R^{64}$, $R^{70}$, $R^{69}$, $R^{68}$, $R^{76}$, $R^{77}$, $R^{78}$, $R^{79}$, $R^{80}$, $R^{81}$, $R^{88}$, $R^{89}$, $R^{90}$, $R^{91}$ and $R^{92}$ are each independently hydrogen, hydrocarbyl, substituted hydrocarbyl, an inert functional group, and provided that any two of these groups vicinal to one another taken together may form a ring;

$R^{73}$ is hydrocarbyl, substituted hydrocarbyl, —$SR^{132}$, —$OR^{132}$, or —$NR^{133}{}_2$, $R^{72}$ is hydrogen, a functional group, hydrocarbyl or substituted hydrocarbyl, and $R^{71}$ is hydrocarbyl or substituted hydrocarbyl, and provided that $R^{73}$ and $R^{72}$ or $R^{72}$ and $R^{131}$ taken together may form a ring;

$R^{82}$, $R^{83}$, $R^{84}$ and $R^{85}$ are each independently hydrogen, hydrocarbyl, substituted hydrocarbyl, or an inert functional group;

$R^{86}$ and $R^{87}$ are each independently hydrogen, hydrocarbyl or substituted hydrocarbyl;

w is 1, 2 or 3;

$Ar^{26}$, $Ar^{17}$, $Ar^{18}$, $Ar^{19}$, $Ar^{20}$ and $Ar^{21}$ are each independently hydrocarbyl or substituted hydrocarbyl;

$R^{132}$ is hydrocarbyl or substituted hydrocarbyl;

each $R^{133}$ is independently hydrogen, hydrocarbyl or substituted hydrocarbyl;

G and L are both N or G is $CR^{134}$ and L is $CR^{135}$;

$R^{135}$, $R^{93}$ and $R^{134}$ are each independently hydrogen, hydrocarbyl or substituted hydrocarbyl, or any two of $R^{93}$, $R^{134}$ and $R^{135}$ taken together form a ring;

$R^{94}$, $R^{95}$, $R^{96}$, $R^{97}$, $R^{98}$, $R^{99}$, $R^{100}$, $R^{101}$, $R^{102}$, $R^{103}$ and $R^{104}$ are each independently hydrogen, hydrocarbyl, substituted hydrocarbyl, or a functional group;

$R^{105}$, $R^{106}$, $R^{107}$ and $R^{108}$ are each independently hydrocarbyl or substituted hydrocarbyl;

$R^{109}$ and $R^{110}$ are each independently hydrocarbyl or substituted hydrocarbyl;

$R^{111}$, $R^{112}$, $R^{113}$, and $R^{114}$ are each independently hydrogen, hydrocarbyl, substituted hydrocarbyl or a functional group;

both of T are S (sulfur) or NH (amino);

each J is N (nitrogen) or $CR^{136}$ wherein $R^{136}$ is hydrogen, hydrocarbyl, substituted hydrocarbyl or a functional group;

$R^{115}$, $R^{116}$, $R^{117}$, $R^{118}$, $R^{119}$, $R^{120}$, $R^{121}$, and $R^{122}$ are each independently hydrogen, hydrocarbyl, substituted hydrocarbyl, or a functional group;

$R^{123}$, $R^{124}$, $R^{125}$, $R^{126}$, $R^{127}$, $R^{128}$, $R^{129}$, and $R^{130}$ are each independently hydrogen, hydrocarbyl, substituted hydrocarbyl or a functional group; and $R^{74}$ and $R^{75}$ are each independently hydrogen, hydrocarbyl or substituted hydrocarbyl;

and provided that when said ligand is any one of (XXV) through (XXXVI) said transition metal is nickel.

DETAILS OF THE INVENTION

In the polymerization processes and catalyst compositions described herein certain groups may be present. By hydrocarbyl is meant a univalent radical containing only carbon and hydrogen. By saturated hydrocarbyl is meant a univalent radical which contains only carbon and hydrogen, and contains no carbon-carbon double bonds, triple bonds and aromatic groups. By substituted hydrocarbyl herein is meant a hydrocarbyl group which contains one or more (types of) substituents that does not interfere with the operation of the polymerization catalyst system. Suitable substituents in some polymerizations may include some or all of halo, ester, keto (oxo), amino, imino, carboxyl, phosphite, phosphonite, phosphine, phosphinite, thioether, amide, nitrile, and ether. Preferred substituents are halo, ester, amino, imino, carboxyl, phosphite, phosphonite, phosphine, phosphinite, thioether, and amide. Which substituents are useful in which polymerizations may in some cases be determined by reference to World Patent Applications 96/23010 and 97/02298, and U.S. Pat. No. 5,714,556. By (substituted) hydrocarbylene is meant a group analogous to hydrocarbyl, except the radical is divalent. By benzyl is meant the $C_6H_5CH_2$— radical, and substituted benzyl is a radical in which one or more of the hydrogen atoms is replaced by a substituent group (which may include hydrocarbyl). By an aryl moiety is meant a univalent group whose free valence is to a carbon atom of an aromatic ring. The aryl moiety may contain one or more aromatic ring and may be substituted by inert groups. By phenyl is meant the $C_6H_5$— radical, and a phenyl moiety or substituted phenyl is a radical in which one or more of the hydrogen atoms is replaced by a substitutent group (which may include hydrocarbyl). Preferred substituents for substituted benzyl and phenyl include those listed above for substituted hydrocarbyl, plus hydrocarbyl. If not otherwise stated, hydrocarbyl, substituted hydrocarbyl and all other groups containing carbon atoms, such as alkyl, preferably contain 1 to 20 carbon atoms.

By a styrene herein is meant a compound of the formula

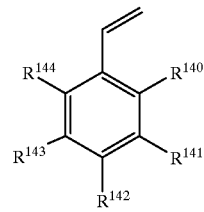

(XXXIX)

wherein $R^{140}$, $R^{141}$, $R^{142}$, $R^{143}$ and $R^{144}$ are each independently hydrogen, hydrocarbyl, substituted hydrocarbyl or a functional group, all of which are inert in the polymerization process. It is preferred that all of $R^{140}$, $R^{141}$, $R^{142}$, $R^{143}$ and $R^{144}$ are hydrogen. Styrene (itself) is a preferred styrene.

By a norbornene is meant ethylidene norbornene, dicyclopentadiene, or a compound of the formula

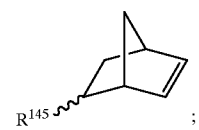

(XXXX)

wherein $R^{145}$ is hydrogen or hydrocarbyl containing 1 to 20 carbon atoms. It is preferred that $R^{145}$ is hydrogen or alkyl, more preferably hydrogen or n-alkyl, and especially preferably hydrogen. The norbornene may be substituted by one or more hydrocarbyl, substituted hydrocarbyl or functional groups in the $R^{145}$ or other positions, with the exception of the vinylic hydrogens, which remain. Norbornene (itself), dimethyl endo-norbornene-2,3-dicarboxylate, t-butyl 5-norbornene-2-carobxylate are preferred norbornenes and norbornene (itself) is especially preferred.

By a π-allyl group is meant a monoanionic ligand with 3 adjacent $sp^2$ carbon atoms bound to a metal center in an $\eta^3$ fashion. The three $sp^2$ carbon atoms may be substituted with other hydrocarbyl groups or functional groups. Typical π-allyl groups include

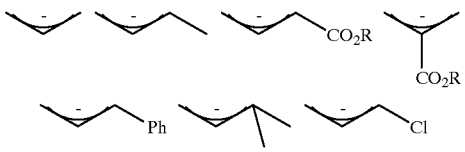

wherein R is hydrocarbyl. By a π-benzyl group is meant π-allyl ligand in which two of the $sp^2$ carbon atoms are part of an aromatic ring. Typical π-benzyl groups include

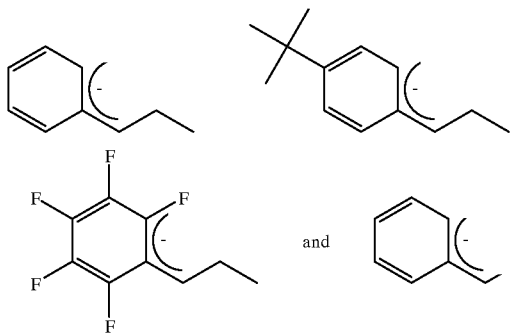

π-Benzyl compounds usually initiate polymerization of the olefins fairly readily even at room temperature, but π-allyl compounds may not necessarily do so. Initiation of π-allyl compounds can be improved by using one or more of the following methods:

Using a higher temperature such as about 80° C.

Decreasing the bulk of the monoanionic ligand, such as aryl being 2,6-dimethylphenyl instead of 2,6-diisopropylphenyl.

Making the π-allyl ligand more bulky, such as using

rather than the simple π-allyl group itself.

Having a Lewis acid or a material that acts as a Lewis acid present while using a π-allyl or π-benzyl group, especially a functional π-allyl or π-benzyl group. Relatively weak Lewis acids such as triphenylborane, tris(pentafluorophenyl)borane, tris(3,5-trifluoromethylphenyl)borane, and poly(methylaluminoxane) are preferred. Suitable functional groups include chloro and ester.

Where applicable, $E_s$ refers to the steric effect of a group. The steric effect of various groupings has been quantified by a parameter called $E_s$, see R. W. Taft, Jr., J. Am. Chem. Soc., vol. 74, p. 3120–3128 (1952), and M. S. Newman, Steric Effects in Organic Chemistry, John Wiley & Sons, New York, 1956, p. 598–603. For the purposes herein, the $E_s$ values are those described in these publications. If the value for $E_s$ for any particular group is not known, it can be determined by methods described in these publications. For the purposes herein, the value of hydrogen is defined to be the same as for methyl. It is preferred that the total $E_s$ value for the ortho (or other substituents closely adjacent to the —OH group) substitutents in the ring be about −1.5 or less, more preferably about −3.0 or less. Thus in a compound such as 2,4,6-tri-t-butylphenol only the $E_s$ values for the 2 and 6 substituted t-butyl groups would be applicable.

Noncoordinating ions are mentioned and useful herein. Such anions are well known to the artisan, see for instance W. Beck., et al., Chem. Rev., vol. 88, p. 1405–1421 (1988), and S. H. Strauss, Chem. Rev., vol. 93, p. 927–942 (1993), both of which are hereby included by reference. Relative coordinating abilities of such noncoordinating anions are described in these references, Beck at p. 1411, and Strauss at p. 932, Table III. Useful noncoordinating anions include $SbF_6^-$, BAF, $PF_6^-$, or $BF_4^-$, wherein BAF is tetrakis[3,5-bis(trifluoromethyl)phenyl]borate.

A neutral Lewis acid or a cationic Lewis or Bronsted acid whose counterion is a weakly coordinating anion may also be present as part of the catalyst system. By a "neutral Lewis acid" is meant a compound which is a Lewis acid capable of abstracting an anion from a late transition metal compound to form a weakly coordination anion. The neutral Lewis acid is originally uncharged (i.e., not ionic). Suitable neutral Lewis acids include $SbF_5$, $Ar_3B$ (wherein Ar is aryl), and $BF_3$. By a cationic Lewis acid is meant a cation with a positive charge such as $Ag^+$, $H^+$, and $Na^+$.

In many of those instances in which the transition metal compound does not contain an alkyl or hydride group already bonded to the metal, the neutral Lewis acid or a cationic Lewis or Bronsted acid also alkylates or adds a hydride to the metal, i.e., causes an alkyl group or hydride to become bonded to the metal atom, or a separate (from W) compound is added to add the alkyl or hydride group.

A preferred neutral Lewis acid, which can alkylate the metal, is a selected alkyl aluminum compound, such as $R^9{}_3Al$, $R^9{}_2AlCl$, $R^9AlCl_2$, and "$R^9AlO$" (alkylaluminoxanes), wherein $R^9$ is alkyl containing 1 to 25 carbon atoms, preferably 1 to 4 carbon atoms. Suitable alkyl aluminum compounds include methylaluminoxane (which is an oligomer with the general formula $[MeAlO]_n$), $(C_2H_5)_2AlCl$, $C_2H_5AlCl_2$, and $[(CH_3)_2CHCH_2]_3Al$. Metal hydrides such as $NaBH_4$ may be used to bond hydride groups to the metal M.

For (IV) through (XXIV) preferred formulas and compounds (as ligands for polymerization catalysts) are found in World Patent Applications 96/23010 and 97/02298, both of which are hereby included by reference, and preferred grouping and compounds in these applications are also preferred herein. However the compound numbers and group (i.e., $R^x$) numbers in these Applications may vary from those herein, but they are readily convertible. These applications also describe synthesis of the various ligands. A preferred ligand is (IV).

There are many different ways of preparing active polymerization catalysts of transition metal coordination compounds of compounds as described herein, many of which are described in World Patent Applications 96/23010 and 97/02298, and those so described are applicable herein. "Pure" compounds which themselves may be active polymerization catalysts may be used, or the active polymerization catalyst may be prepared in situ by a variety of methods.

For instance, olefins may be polymerized by contacting, at a temperature of about −100° C. to about +200° C. a first compound W, which is a neutral Lewis acid capable of abstracting an anion to form a weakly coordinating anion; or a cationic Lewis or Bronsted acid whose counterion is a weakly coordinating anion; a second compound such as

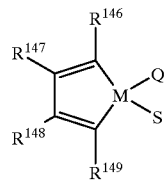

(XXXXI)

and one or more polymerizable olefins wherein:

M is an appropriate transition metal;

$R^{146}$ and $R^{149}$ are each independently hydrocarbyl or substituted hydrocarbyl, provided that the carbon atom bound to the imino nitrogen atom has at least two carbon atoms bound to it;

$R^{147}$ and $R^{148}$ are each independently hydrogen, hydrocarbyl, substituted hydrocarbyl, or $R^{14}$ and $R^{15}$ taken together are hydrocarbylene or substituted hydrocarbylene to form a ring;

Q is alkyl, hydride, chloride, iodide, or bromide; and

S is alkyl, hydride, chloride, iodide, or bromide.

In this instance it is preferred that W is an alkyl aluminum compound. Other methods for preparing active polymerization catalyst will be found in these patent applications and in the Examples herein.

Polymerizations with nickel complexes of (XXV) through (XXXVI) and compounds (XXXVII) and (XXXVIII) are described in U.S. patent application Ser. No. 09/006,536, filed Jan. 13, 1998, now U.S. Pat. No. 6,174,975 (World Patent Application 98/30609), which is hereby included by reference. It will be noted that (XXV) through (XXXVI) are monoanionic ligands. Synthesis of these ligands, their nickel complexes, and active olefin polymerization catalysts are found in this patent application, along with information on polymerization conditions. A preferred ligand (and its nickel compounds) is (XXVI). All preferred forms of these ligands and compounds are as described in U.S. patent application Ser. No. 09/006,536, filed Jan. 13, 1998, now U.S. Pat. No. 6,174,975 (World Patent Application 98/30609).

Which active polymerization catalysts will polymerize which olefins (not all catalysts will polymerize all olefins or combinations of olefins) will also be found in World Patent Applications 96/23010 and 97/02298 and U.S. patent application Ser. No. 09/006,536, filed Jan. 13, 1998, now U.S. Pat. No. 6,174,975 (World Patent Application 98/30609). Monomers useful herein include ethylene, propylene, other α-olefins of the formula $R^{150}CH=CH_2$, wherein $R^{150}$ is n-alkyl containing 2 to about 20 carbon atoms, cyclopentene, a styrene, and a norbornene. Preferred monomers are ethylene, propylene and cyclopentene, and ethylene is especially preferred.

For all polymerization catalysts, where applicable, nickel is a preferred transition metal.

When hydrogen is used as the chain transfer agent it is preferred that the amount of hydrogen present be about 0.01 to about 50 mole percent of the olefin present, preferably about 1 to about 20 mole percent. When liquid monomers (olefins) are present, one may need to experiment briefly to find the relative amounts of liquid monomers and hydrogen (as a gas). When a silane of the formula $R^1R^2R^3SiH$ is used, it is preferred that the molar ratio of transition metal compound:silane is about 0.01 to about 100,000, more preferably about 1 to about 10,000. When $CBr_4$ is the chain transfer agent it is preferred that the molar ratio of transition metal compound:$CBr_4$ is about 0.01 to about 1000, preferably about 1 to about 100.

When the polymerization is carried out the in the gas phase (the monomer is transported to the polymerization site while in the gas phase) hydrogen or a relatively volatile silane is a preferred chain transfer agent. The polymerization may also be carried out in solution or slurry using these chain transfer agents. In these instances, silanes are the preferred chain transfer agents.

The transition metal compounds and/or any needed cocatalysts such as alkylaluminum compounds may be supported (attached to and/or on the surface of) solid supports such as alumina, silica, and inorganic salts such as magnesium chloride. Such supported catalysts are especially useful in gas phase polymerizations. Such supported catalysts are known in the art.

In some preferred silanes, $R^3$ is alkyl and/or both $R^2$ and $R^3$ have 2 or more carbon atoms and/or $R^1$, $R^2$ and $R^3$ are alkyl groups independently containing 2 to 6 carbon atoms. Especially preferred silanes are triethylsilane, trimethylsilane, diethylsilane and dimethylsilane, and triethylsilane and trimethylsilane as more preferred. In another preferred silane, $R^1$ contains 2 or more carbon atoms.

The polymers produced in these processes are useful as elastomers, molding resins, extrusion resins as for packaging films, and various other uses, depending on the properties of the resulting polymer.

In the Examples and Comparative Examples, all pressures are gauge pressures. The following abbreviations are used:

DSC-Differential Scanning Calorimetry

GPC-Gel Permeation Chromatography

MMAO-modified methyl alumoxane

Mn-number average molecular weight

Mw-weight average molecular weight

Mz-"z" average molecular weight

PE-polyethylene

TCB-trichlorobenzene

Tm-melting point

EXAMPLE 1

$H_2$ Chain Transfer $H_2$ Chain Transfer

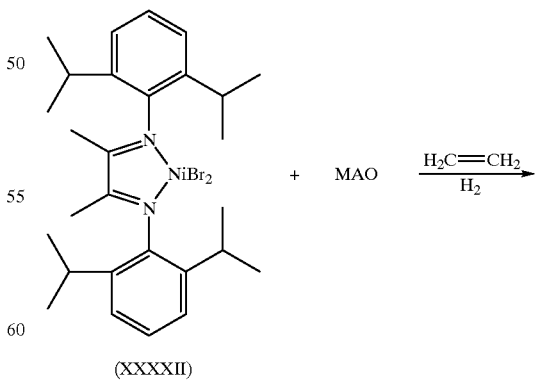

(XXXII)

POLYETHYLENE

A 5.1 mg (0.0082-mmol) sample of (XXXXII) was placed in 600-mL stirred autoclave under nitrogen. The autoclave was sealed and 200 mL of dry, deaerated hexane and 0.5 mL of modified methylalumoxane (Akzo Inc., MMAO-3A; nominal 1.7M in heptane; contains about 30% isobutyl groups) were injected into the autoclave through the head port with stirring. The autoclave body was immersed in a cool water bath and was pressured with hydrogen to 140 kPa. Then ethylene was introduced to give a total pressure of 690 kPa (20 mol % hydrogen) and the reaction was stirred for 1 h, the internal temperature being maintained at 22° C. After 1 h, the bath was removed and the ethylene was vented. The autoclave contained a suspension of white, powdery polymer. The polymer was boiled with methanol to remove catalyst and solvent, filtered, and dried (vacuum oven; 75° C.) to yield 13.0 g of polyethylene. DSC (10° C./min): Tm=114° C. (139 J/g). $^1$H NMR (tetrachloroethane-$d_2$; 100° C.): 18 $CH_3/1000$ $CH_2$. GPC (TCB; 135° C.; PE standard): Mn=21,900; Mw=69,000; Mz=170,000; Mw/Mn=3.16.

COMPARATIVE EXAMPLE 1

A 23-mg (0.037-mmol) sample of (XXXXII) was placed in a 600-mL stirred autoclave under nitrogen. The autoclave was sealed and 200 mL of dry, deaerated hexane and 0.6 mL of polymethylalumoxane (Akzo; nominal 3.3M) were injected into the autoclave through the head port with stirring. The autoclave body was immersed in a water bath (15° C.) and was pressured with ethylene to 690 kPa and stirred for 10 min. The internal temperature rose from 18° C. to 40° C. over the course of the polymerization; after 10 min the ethylene was vented. The autoclave contained fibrous polymer floating in hexane. The polymer was boiled with aqueous HCl and methanol to remove catalyst; drying under high vacuum yielded 6.26 g polyethylene. DSC (10° C./min): Tm=111° C. (172 J/g). GPC data (TCB; 135° C.; PE standard): Mn=1,058,000; Mw=2,007,000; Mz=3,121,000; Mw/Mn=1.90.

EXAMPLE 2 $H_2$ Chain Transfer

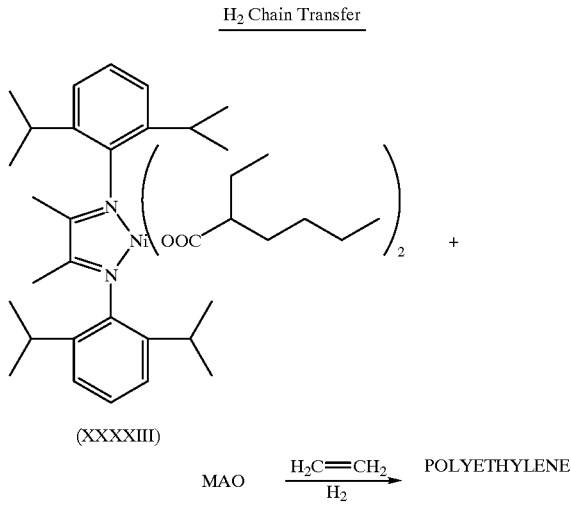

(XXXXIII)

MAO $\xrightarrow[H_2]{H_2C=CH_2}$ POLYETHYLENE

Ethylene was continuously polymerized at 690 kPa and 50° C. in a 3.8 L stirred autoclave with the following feed rates: hexane (3600 mL/h); ethylene (240 g/h); hydrogen (0.1 g/h; 0.6mol % hydrogen); modified methylalumoxane (Akzo MMAO-3A, 1.3M in heptane; 20 mL/h; 26 mmol/h); and (XXXXIII) (1 w/v % in hexane; 20 mL/h; 0.27 mmol/h). A back-pressure valve was used to regulate autoclave pressure and allow polymer solution to exit from the autoclave in a controlled fashion. The reactor effluent, a solution of amorphous, elastomeric polyethylene, was collected continuously from the let-down line. After 5h of polymerization, the hydrogen feed was reduced to 0.05 g/h (0.3 mol % hydrogen). The polymerization was run under these conditions for an additional 6 h. Polymer samples were taken at 5 h and 11 h to determine their properties, which are shown in Table 1. (NMR solvent: $CDCl_3$. GPC conditions: trichlorobenzene; 135° C.; PE standard)

TABLE 1

| $H_2$ Feed (g/hr) | [$H_2$]:[Catalyst] | $^1$H NMR ($CH_3/1000$ $CH_2$) | GPC (Mn/Mw) |
|---|---|---|---|
| 0.1 | 185 | 94 | 44,800/75,400 |
| 0.05 | 93 | 91 | 56,500/101,000 |

The 5-h polymer was an elastic gum; the polymer production rate at 5 h was about 55 g/hr. The 11-h polymer was a low-melting but strong gum elastomer at room temperature; the polymer production rate at 11 h was about 50 g/h.

EXAMPLE 3

$H_2$ Chain Transfer

The polymerization of Example 2 was repeated except that the two levels of hydrogen used were 1.7 g/h (first 7 h; 9.0 mol % hydrogen) and 0.5 g/h (next 6 h; 2.8 mol % hydrogen). The properties of the polymer produced under these respective conditions are shown in Table 2. Polymer production rate at 5 h was about 8 g/h; the rate at 13 h was about 14 g/h.

TABLE 2

| $H_2$ Feed (g/hr) | [$H_2$]:[Catalyst] | $^1$H NMR ($CH_3/1000$ $CH_2$) | GPC (Mn/Mw) |
|---|---|---|---|
| 1.7 | 6,850 | 98 | 2,980/9,570 |
| 0.5 | 926 | 88 | 9,720/24,300 |

EXAMPLE 4

$H_2$ Chain Transfer

The polymerization of Example 2 was repeated except that the two levels of hydrogen used were 10 g/h (first 5 h; 37 mol % hydrogen) and 5 g/h (next 6 h; 23 mol % hydrogen). The properties of the polymer produced under these respective conditions are shown in Table 3. Polymer production rate at 5 h was about 3 g/h; the rate at 11 h was about 8 g/h.

TABLe 3

| $H_2$ Feed (g/hr) | [$H_2$]:[Catalyst] | $^1$H NMR ($CH_3/1000$ $CH_2$) | GPC (Mn/Mw) |
|---|---|---|---|
| 10 | 18,520 | 173 | 163/1,480 |
| 5 | 9,260 | 126 | 351/4,020 |

Et₃SiH Chain Transfer

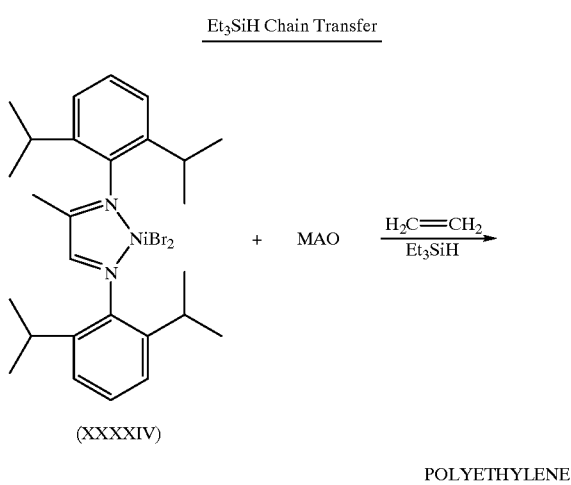

(XXXXIV)

POLYETHYLENE

Ethylene polymerizations were run in a 600-mL stirred autoclave under the following conditions: the autoclave was loaded under nitrogen with 200 mL dry, deaerated toluene. The autoclave was heated to 50° C. and the solvent was saturated with ethylene by pressurizing to 140–210 kPa for a few min with stirring. The ethylene was vented and 1.0 mL of modified methylalumoxane (Akzo MMAO-3A; nominal 2.0M in heptane; contains about 30% isobutyl groups) was injected into the autoclave through a head port. Then a solution of 6.1 mg (0.010 mmol) (XXXXIV) in 2 mL of dry methylene chloride was injected into the autoclave, followed immediately by a solution of triethylsilane (see Table 4 below for quantities of triethylsilane used). The autoclave was pressurized with ethylene to 690 kPa and stirred for 30 min at 50° C. After 30 min, the polymerization was stopped by venting the ethylene and injecting 3 mL of methanol. The toluene solution of polymer was precipitated with methanol containing some aqueous HCl. The polyethylene product was washed with fresh methanol and was vacuum oven-dried (70° C.) under a nitrogen purge. The polymer molecular weight was characterized by gel permeation chromatography (GPC conditions: TCB solvent; 135° C.; PE standard).

TABLe 4

| Example | Et₃SiH (g) | [Et₃SiH]:[Catalyst] | Polymer yeild (g) | GPC (Mn/Mw) |
|---|---|---|---|---|
| 5 | 0.00023 | 0.2 | 15.2 | 72,800/242,000 |
| 6 | 0.00116 | 1 | 16.5 | 75,300/226,000 |
| 7 | 0.00581 | 5 | 17.7 | 70,700/192,000 |
| 8 | 0.58 | 500 | 17.6 | 63,300/179,000 |
| 9 | 2.5 | 2150 | 19.9 | 34,800/124,000 |

EXAMPLE 10

CBr₄ Chain Transfer

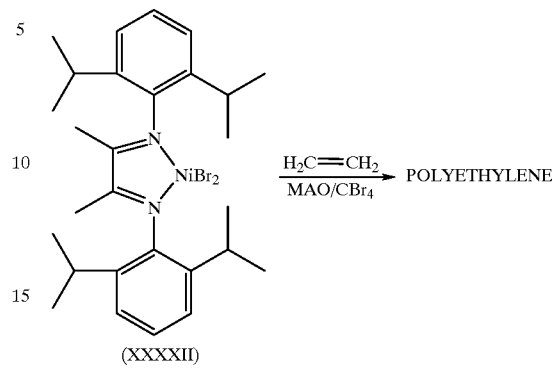

(XXXXII)

A 600-mL stirred autoclave was loaded with 200 mL of dry, deaerated toluene under nitrogen and the autoclave was stirred and heated in a hot water bath to 99° C. Then 0.65 mL (1.1 mmol) of polymethylalumoxane (Akzo MMAO-3A; nominal 1.7M in heptane; contains about 30% isobutyl groups) was injected into the autoclave with stirring. The autoclave was pressured to about 690 kPa with ethylene and stirred for 3 min. Then 1 mL of a suspension of 1 mg (XXXXII) (0.0016 mmol) in toluene containing a 9-fold molar excess of ligand plus 1 mL of a toluene solution containing 32 mg/mL carbon tetrachloride and 56 mg/mL carbon tetrabromide was placed in a 2-mL blowcase tube and was injected into the autoclave with ethylene pressure. The CBr₄:Ni ratio was 100. The autoclave was pressured to 1.09 MPa and was stirred for 30 min as the temperature held at 99° C. The ethylene was vented and the clear solution in the autoclave was concentrated by rotary evaporation. Methanol was added to precipitate the polymer; vacuum oven drying (70° C.) yielded 0.41 g of rubbery polyethylene. GPC (trichlorobenzene; 135° C.; PE standard): Mn=42,600; Mw=104,000; Mz=205,000; Mw/Mn=2.44. $^1$H NMR (CDCl₃): 138 CH₃/1000 CH₂.

COMPARATIVE EXAMPLE 10

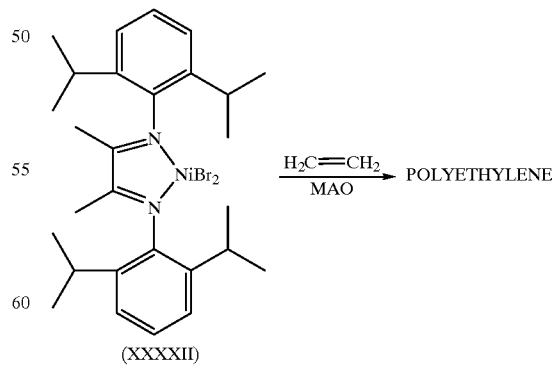

(XXXXII)

A suspension was made of 14 mg of (XXXXII) in 14 mL dry, deaerated toluene; the concentration of the nickel catalyst complex was 1.0 mg/mL (0.0016 mmol/mL).

A 600-mL stirred autoclave was loaded with 200 mL of dry, deaerated toluene under nitrogen and the autoclave was stirred and heated in a hot water bath to 95° C. Then 0.65 mL of modified methylalumoxane (Akzo MMAO-3A; nominal 1.7M in heptane; contains about 30% isobutyl groups) was injected into the autoclave with stirring. The autoclave was pressured to about 690 kPa with ethylene and stirred for 3 min. Then 1.0 mL of the 0.0016 mM nickel catalyst complex suspension plus 1 mL of toluene was placed in a blowcase tube attached to an autoclave head port and the solution was injected into the autoclave with ethylene pressure. The autoclave was pressured to 1.07 MPa with ethylene and was stirred for 30 min at 95° C. The ethylene was vented and the clear solution in the autoclave was concentrated by rotary evaporation. Methanol was added to the concentrate to precipitate the polymer; vacuum oven drying (70° C.) yielded 0.86 g of rubbery polyethylene. Gel permeation chromatography (trichlorobenzene; 135° C.; PE standard): Mn=42,300; Mw=148,000; Mz=330,000; Mw/Mn=3.49. $^1$H NMR (CDCl$_3$): 127 CH$_3$/1000 CH$_2$.

What is claimed is:

1. An improved process for the polymerization of a polymerizable olefin consisting essentially of one or more of ethylene, propylene or an α-olefin of the formula $R^{150}CH=CH_2$, wherein $R^{150}$ is n-alkyl containing 2 to about 20 carbon atoms, using as a polymerization catalyst a complex of a bidentate ligand of a metal selected from the group consisting of nickel, iron, and cobalt, wherein the improvement comprises, using as a chain transfer agent:

hydrogen in an amount of about 0.01 to about 50 mole percent of the olefin present;

CBr$_4$ in a molar ratio of transition metal compound:CBr$_4$ of about 0.01 to about 1000; or a silane of the formula $R^1R^2R^3SiH$, wherein $R^1$ is alkyl, $R^2$ is alkyl, and $R^3$ is hydrogen or alkyl, in a molar ratio of transition metal compound:silane of about 0.01 to 100,000.

2. A process for the polymerization of one or more polymerizable olefins, comprising the step of contacting:

(a) one or more polymerizable olefins;

(b) an effective amount of a chain transfer agent selected from the group consisting of:
      (i) hydrogen in an amount of about 0.01 to about 50 mole percent of the olefin present,
      (ii) CBr$_4$ in a molar ratio of transition metal compound:CBr$_4$ of about 0.01 to about 1000, and
      (iii) a silane of the formula $R^1R^2R^3SiH$, wherein $R^1$ is alkyl, $R^2$ is alkyl, and $R^3$ is hydrogen or alkyl, in a molar ratio of transition metal compound:silane of about 0.01 to 100,000; and (c) an active polymerization catalyst which contains a nickel complex of a ligand of the formula

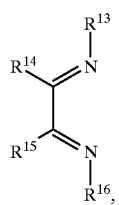

(IV)

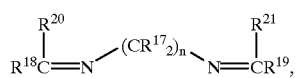

(V)

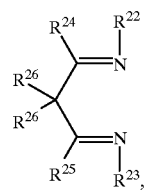

(VI)

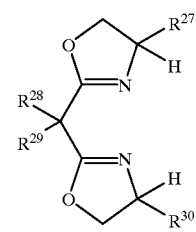

(VII)

$Ar^1Q_p$ (VIII); $R^{31}R^{32}N-CR^{33}R^{34}(CR^{35}R^{36})_m-NR^{31}R^{32}$ (IX);

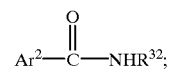

(X)

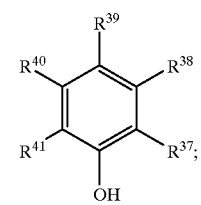

(XI)

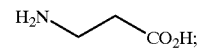

(XII)

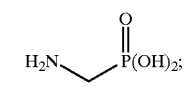

(XIII)

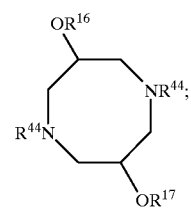

(XIV)

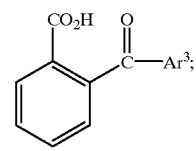

(XV)

-continued (XVI)

(XVII)

(XVIII)

(XIX)

(XX)

(XXI)

R⁴⁷R⁴⁸R⁴⁹P;    (XXII)

(XXIII)

R³¹S—CR³³R³⁴(CR³⁵R³⁶)ₘ—SR³¹;    (XXIV)

(XXV)

(XXVI)

-continued (XXVII)

(XXVIII)

(XXIX)

(XXX)

(XXXI)

(XXXII)

(XXXIII)

-continued

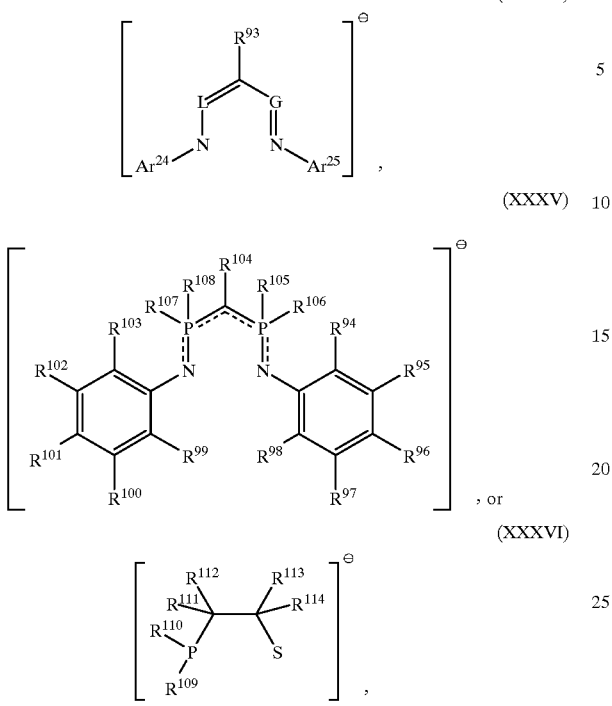

(XXXIV)

(XXXV)

(XXXVI)

or a compound of the formula

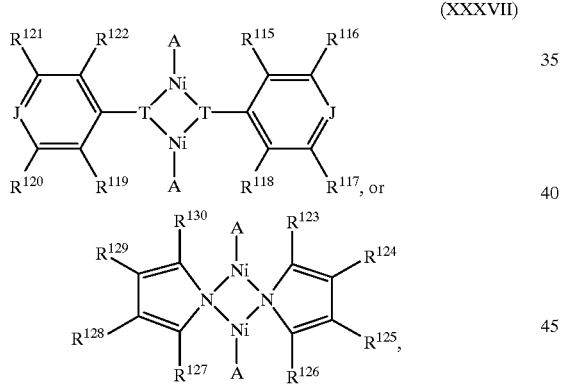

(XXXVII)

wherein:
$R^{13}$ and $R^{16}$ in (IV) are each independently hydrocarbyl or substituted hydrocarbyl, provided that the carbon atom bound to the imino nitrogen atom has at least two carbon atoms bound to it;
$R^{14}$ and $R^{15}$ are each independently hydrogen, hydrocarbyl, substituted hydrocarbyl, or $R^{14}$ and $R^{15}$ taken together are hydrocarbylene substituted hydrocarbylene to form a carbocyclic ring;
$R^{18}$ is hydrocarbyl or substituted hydrocarbyl, and $R^{20}$ is hydrogen, hydrocarbyl or substituted hydrocarbyl or $R^{18}$ and $R^{20}$ taken together form a ring;
$R^{19}$ is hydrocarbyl or substituted hydrocarbyl, and $R^{21}$ is hydrogen, substituted hydrocarbyl or hydrocarbyl, or $R^{19}$ and $R^{21}$ taken together form a ring;
each $R^{17}$ in (V) is independently hydrogen, substituted hydrocarbyl or hydrocarbyl, or two of $R^{17}$ in (V) taken together form a ring;
n is 2 or 3;

$R^{22}$ and $R^{23}$ are each independently hydrocarbyl or substituted hydrocarbyl, provided that the carbon atom bound to the imino nitrogen atom has at least two carbon atoms bound to it;
$R^{24}$ and $R^{25}$ are each independently hydrogen, hydrocarbyl, or substituted hydrocarbyl;
each $R^{26}$ is independently hydrogen, hydrocarbyl or substituted hydrocarbyl;
$R^{27}$ and $R^{30}$ are independently hydrocarbyl or substituted hydrocarbyl;
$R^{28}$ and $R^{29}$ are each in independently hydrogen, hydrocarbyl or substituted hydrocarbyl; and
$Ar^1$ is an aromatic moiety with n free valencies, or diphenylmethyl;
each Q is $-NR^{52}R^{53}$ or $-CR^{54}=NR^{55}$;
p is 1 or 2;
each $R^{52}$ is independently hydrogen, benzyl, substituted benzyl, phenyl or substituted phenyl;
each $R^{54}$ is independently hydrogen or hydrocarbyl; and
each $R^{55}$ is independently a monovalent aromatic moiety;
$R^{53}$ is hydrogen or alkyl;
each $R^{33}$, $R^{34}$, $R^{35}$, and $R^{36}$ is independently hydrogen, hydrocarbyl or substituted hydrocarbyl;
each $R^{31}$ is independently hydrocarbyl or substituted hydrocarbyl containing 2 or more carbon atoms;
each $R^{32}$ is independently hydrogen, hydrocarbyl or substituted hydrocarbyl;
m is 1, 2 or 3;
$Ar^2$ is an aryl moiety;
$R^{38}$, $R^{39}$, and $R^{40}$ are each independently hydrogen, hydrocarbyl, substituted hydrocarbyl or an inert functional group;
$R^{37}$ and $R^{41}$ are each independently hydrocarbyl, substituted hydrocarbyl or an inert functional group whose $E_s$ is about −0.4 or less;
each $R^{16}$ and $R^{17}$ in (XIV) is independently hydrogen or acyl containing 1 to 20 carbon atoms;
$R^{44}$ is aryl;
$Ar^3$ is an aryl moiety;
$R^{45}$ and $R^{46}$ are each independently hydrogen or hydrocarbyl;
$Ar^4$ is an aryl moiety;
E is 2-thienyl or 2-furyl;
$Ar^5$ and $Ar^6$ are each independently hydrocarbyl;
$Ar^7$ and $Ar^8$ are each independently an aryl moiety;
$Ar^9$ and $Ar^{10}$ are each independently an aryl moiety or $-CO_2R^{56}$ wherein $R^{56}$ is alkyl containing 1 to 20 carbon atoms;
$R^{47}$ and $R^{48}$ are each independently phenyl groups substituted by one or more alkoxy groups, each alkoxy group containing 1 to 20 carbon atoms;
$R^{49}$ is alkyl containing 1 to 20 carbon atoms, or an aryl moiety;
$Ar^{11}$ is an aryl moiety;
$R^{50}$ is hydrogen or hydrocarbyl;
$R^{51}$ is hydrocarbyl or $-C(O)-NR^{50}-Ar^{11}$;
$Ar^{12}$, $Ar^{13}$, $Ar^{14}$, $Ar^{15}$, $Ar^{16}$, $Ar^{22}$, $Ar^{23}$, $Ar^{24}$ and $Ar^{25}$ are each independently aryl or substituted aryl;
$R^{56}$ and $R^{57}$ are each independently hydrogen, hydrocarbyl, substituted hydrocarbyl, or $R^{56}$ and $R^{57}$ taken together form a ring, and $R^{58}$ is hydrogen, hydrocarbyl or substituted hydrocarbyl or $R^{56}$, $R^{57}$ and $R^{58}$ taken together form a ring;
$R^{62}$, $R^{61}$, $R^{60}$, $R^{59}$, $R^{66}$, $R^{65}$, $R^{64}$, $R^{70}$, $R^{69}$, $R^{68}$, $R^{76}$, $R^{77}$, $R^{78}$, $R^{79}$, $R^{80}$, $R^{81}$, $R^{88}$, $R^{89}$, $R^{90}$, $R^{91}$ and $R^{92}$ are each independently hydrogen, hydrocarbyl, substituted hydrocarbyl, an inert functional group, and provided that any two of these groups vicinal to one another taken together may form a ring;

$R^{63}$ and $R^{67}$ are each independently hydrogen, hydrocarbyl or substituted hydrocarbyl;

$R^{73}$ is hydrocarbyl, substituted hydrocarbyl, —$SR^{132}$, —$OR^{132}$, or —$NR^{133}_2$, $R^{72}$ is hydrogen, a functional group, hydrocarbyl or substituted hydrocarbyl, and $R^{71}$ is hydrocarbyl or substituted hydrocarbyl, and provided that $R^{73}$ and $R^{72}$ or $R^{72}$ and $R^{71}$ taken together may form a ring;

$R^{132}$ is hydrocarbyl or substituted hydrocarbyl;

each $R^{133}$ is independently hydrogen, hydrocarbyl or substituted hydrocarbyl;

$R^{74}$ and $R^{75}$ are each independently hydrogen, hydrocarbyl or substituted hydrocarbyl;

$R^{82}$, $R^{83}$, $R^{84}$ and $R^{85}$ are each independently hydrogen, hydrocarbyl, substituted hydrocarbyl, or an inert functional group;

$R^{86}$ and $R^{87}$ are each independently hydrogen, hydrocarbyl or substituted hydrocarbyl;

w is 1, 2 or 3;

$Ar^{26}$, $Ar^{17}$, $Ar^{18}$, $Ar^{19}$, $Ar^{20}$ and $Ar^{21}$ are each independently hydrocarbyl or substituted hydrocarbyl;

G and L are both N or G is $CR^{134}$ and L is $CR^{135}$;

$R^{135}$, $R^{93}$ and $R^{134}$ are each independently hydrogen, hydrocarbyl or substituted hydrocarbyl, or any two of $R^{93}$, $R^{134}$ and $R^{135}$ taken together form a ring;

$R^{94}$, $R^{95}$, $R^{96}$, $R^{97}$, $R^{98}$, $R^{99}$, $R^{100}$, $R^{101}$, $R^{102}$, $R^{103}$ and $R^{104}$ are each independently hydrogen, hydrocarbyl, substituted hydrocarbyl, or a functional group;

$R^{105}$, $R^{106}$, $R^{107}$ and $R^{108}$ are each independently hydrocarbyl or substituted hydrocarbyl;

$R^{109}$ and $R^{110}$ are each independently hydrocarbyl or substituted hydrocarbyl;

$R^{111}$, $R^{112}$, $R^{113}$, and $R^{114}$ are each independently hydrogen, hydrocarbyl, substituted hydrocarbyl or a functional group;

both of T are S (sulfur) or NH (amino);

A is a π-allyl or π-benzyl group;

each J is N (nitrogen) or $CR^{136}$ wherein $R^{136}$ is hydrogen, hydrocarbyl, substituted hydrocarbyl or a functional group; $R^{115}$, $R^{116}$, $R^{117}$, $R^{118}$, $R^{119}$, $R^{120}$, $R^{121}$, and $R^{122}$ are each independently hydrogen, hydrocarbyl, substituted hydrocarbyl, or a functional group; and $R^{123}$, $R^{124}$, $R^{125}$, $R^{126}$, $R^{127}$, $R^{128}$, $R^{129}$ and $R^{130}$ are each independently hydrogen, hydrocarbyl, substituted hydrocarbyl or a functional group.

3. The process as recited in claim 1 or 2 wherein said chain transfer agent is a compound of the formula $R^1R^2R^3SiH$.

4. The process as recited in claim 3 wherein $R^2$ and $R^3$ are each independently alkyl containing 2 or more carbon atoms.

5. The process as recited in claim 3, wherein said compound is triethylsilane.

6. The process as recited in claim 1 or 2 wherein said chain transfer agent is hydrogen.

7. The process as recited in claim 6 wherein a concentration of said hydrogen is about 1 to about 20 mole percent of said polymerizable olefin.

8. The process as recited in claim 1 for 2 wherein said ligand is (IV) and said transition metal is nickel.

9. The process as recited in claim 1 or 2 wherein said ligand is (IV) or (XXVI) and said transition metal is nickel.

10. The process as recited in claim 1 or 2 wherein said polymerizable olefin is ethylene or propylene.

11. The process as recited in claim 1 or 2 wherein said polymerizable olefin is ethylene.

12. The process as recited in claim 3 wherein said polymerization is carried out in the gas phase.

13. The process as recited in claim 3 wherein said polymerization is carried out in the gas phase.

14. The process as recited in claim 3 wherein said polymerization is a solution or slurry polymerization.

15. The process as recited in claim 3 wherein said silane is triethylsilane, trimethylsilane, diethylsilane or dimethylsilane.

* * * * *